United States Patent [19]
Janonis et al.

[11] Patent Number: 5,612,580
[45] Date of Patent: Mar. 18, 1997

[54] UNINTERRUPTIBLE POWER SYSTEM

[75] Inventors: Vytautas F. Janonis, Parma; Roland K. Massatti, Westlake; Regis E. Novitskey, Mentor, all of Ohio

[73] Assignee: Northrop Grumman Corporation, Los Angeles, Calif.

[21] Appl. No.: 541,442

[22] Filed: Oct. 10, 1995

[51] Int. Cl.$^6$ ................................................ H02J 7/00
[52] U.S. Cl. ............................ 307/64; 307/65; 307/66; 363/101
[58] Field of Search .............................. 307/64, 65, 66; 363/101

[56] References Cited

U.S. PATENT DOCUMENTS

| | | | |
|---|---|---|---|
| 5,289,046 | 2/1994 | Gregorich et al. | 307/66 |
| 5,315,533 | 5/1994 | Stich et al. | 364/480 |

Primary Examiner—William M. Shoop, Jr.
Assistant Examiner—Kim Lockett
Attorney, Agent, or Firm—Philip A. Florenzo

[57] ABSTRACT

An uninterruptible power supply for providing continuous power from a power source line to a load is provided. In particular, the uninterruptible power supply may either operate in an "Off-Line" mode or one of two "On-Line" modes. The uninterruptible power supply operates in the "Off-Line" mode when the power source line voltage is above a first threshold value. The uninterruptible power supply routes power from the power source line to the load in the "Off-Line" mode. The uninterruptible power supply operates in a first "On-Line" mode when the power source line voltage drops below a first threshold value but exceeds a second threshold voltage, or the frequency of the power source line exceeds a predetermined range. The uninterruptible power supply boosts the power source line voltage in the first "On-Line" mode of operation and applies the boosted signal to the load. The uninterruptible power supply operates in a second "On-Line" mode of operation when the voltage of the power source line voltage drops below a second threshold value or exceeds a third threshold value. The uninterruptible power supply routes reserve power from an energy storage device to the load in the second "On-Line" mode of operation.

11 Claims, 6 Drawing Sheets

5,612,580

UNINTERRUPTIBLE POWER SYSTEM

BACKGROUND OF THE INVENTION

1. Field of the Invention

The invention relates to power supplies, and more particularly to an uninterruptible power supply which supplies clean and continuous electrical power to a load.

2. Description of the Prior Art

A variety of power supplies exist for powering various electronic devices. A large number of the electronic devices require continuous power for proper operation. For example, computers must receive continuous power in order to avoid costly down time, and more importantly, prevent the loss of data. Therefore, unforseeable power source line disturbances, ranging from deviations from the specified line voltage known as "Brown-outs" or "Brown-power" to complete loss of power, must be eliminated to provide the desired continuous power to the electronic device or computer.

Conventional uninterruptible power supplies traditionally condition the AC line voltage from the power source line to provide useable continuous power. In particular, high power 60 Hz transformers have been utilized to provide isolation from the power source line. While the high power 60 Hz transformers provide isolation from the power source line, the 60 Hz transformers have excessive weight and may interfere with common applications which involve computers and computer networks.

Conventional uninterruptible power supplies typically utilize an array of on-board storage devices or batteries to supply reserve power when there is a line disturbance or power shortage on the power source line. These storage devices may only provide adequate power for a short period of time before they need to be recharged. Therefore, an immediate switch from power source line power to reserve power from the batteries when the power source line voltage sags below a first threshold value may result in the premature depletion of battery power.

SUMMARY OF THE INVENTION

The invention provides for an uninterruptible power supply to provide continuous electrical power from a power source line to a load. The uninterruptible power supply in accordance with the present invention includes a line booster circuit coupled to the power source line to increase the voltage of a signal applied to the load from the power source line when the voltage of the power source line drops below a first threshold value. An internal supply circuit is further provided within the uninterruptible power supply to supply reserve power to the load when the voltage of the power source line drops below a second threshold value. The uninterruptible power supply additionally includes a transfer switch to selectively connect one of the power source line and the line booster circuit and the internal supply circuit to the load.

The line booster circuit in one embodiment of the uninterruptible power supply includes a first converter coupled to the power source line to convert a line AC signal therefrom to a DC signal, a second converter coupled to the first converter to increase the voltage of the DC signal, and an inverter coupled to the second converter to convert the DC signal to a load AC signal for application to the load.

The internal supply circuit of one embodiment of the uninterruptible power supply includes an energy storage device for storing reserve power and the energy storage device is coupled to the second converter and the inverter.

DETAILED DESCRIPTION OF THE PREFERRED EMBODIMENTS

Figure 1:
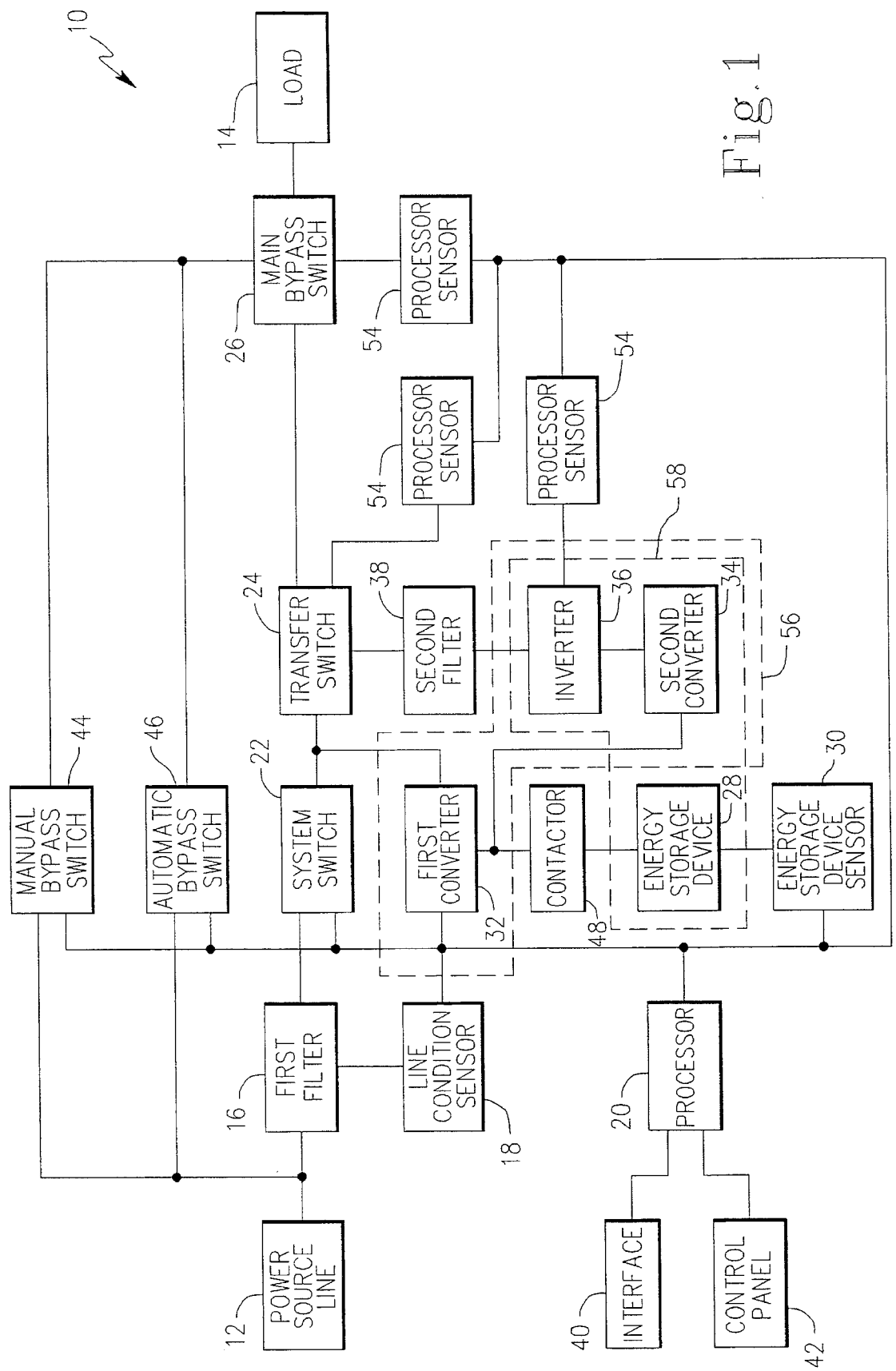
FIG. 1 is a functional block diagram of one embodiment of the uninterruptible power supply in accordance with the present invention.

The power source line 12 is connected with an input of the uninterruptible power supply 10 as shown in FIG. 1. A load 14, such as computer, LAN/WAN, data processing or communications equipment is connected to an output of the uninterruptible power supply 10.

The power from the power source line 12 enters the uninterruptible power supply 10 through an input and is applied to a first filter 16. The first filter 16 provides increased resistance to higher frequency disturbances associated with electromagnetic interference and radio frequency interference (EMI\RFI) which may cause false line disturbance detection.

The first filter 16 is coupled with at least one line condition sensor 18 for measuring diagnostic information, such as proper amplitude, wave forms and frequency characteristics, from the power source line 12. The line diagnostic information is applied to a processor 20.

The processor 20 monitors diagnostic information received from a plurality of processor sensors 18, 30, 54 and controls the passage of the power from the power source line 12 to the load 14. The uninterruptible power supply 10 may operate in an "Off-Line" mode and an "On-Line" mode. In particular, the uninterruptible power supply 10 operates in an "Off-Line" mode if a line AC signal from the power source line 12 is acceptable (i.e. the amplitude of the voltage from the power source line 12 is above a first threshold) and an "On-Line" mode if the line AC signal from the power source line 12 is unacceptable (i.e. the amplitude of the voltage from the power source line 12 is below the first threshold).

If the power source line 12 power is acceptable, the processor 20 closes a system switch 22 which connects the first filter 16 to the transfer switch 24. The processor 20 additionally configures the transfer switch 24 and a main bypass switch 26 to pass power source line 12 power to the output of the uninterruptible power supply 10. The utility power is subsequently applied to the loads 14 coupled with the output of the uninterruptible power supply 10.

The processor 20 continually monitors the system operation when the uninterruptible power supply 10 is in the "Off-Line" mode. In particular, the processor 20 tests the status of an energy storage device 28, such as a battery or battery array, through an energy storage device sensor 30 and determines the ability of the energy storage device 28 to accept and hold a charge.

The power source line 12 power is utilized to charge the energy storage device 28 if the energy storage devices 28 are not completely charged. In particular, the power source line 12 power is applied to a first converter 32 where the line AC signal from the power source line 12 is rectified to DC power. The first converter 32 applies DC power to the energy storage device 28 via contactor 48 to charge the energy storage device 28.

The power source line 12 power is additionally used to trickle charge the energy storage devices 28 as long the energy storage device 28 is fully charged. Applying a trickle charge maintains the energy storage device 28 in a standby condition and prevents the energy storage device 28 from self-discharging.

The uninterruptible power supply 10 may preferably include a contactor 48 interposed between the first converter 32 and the energy storage device 28 to isolate the energy storage device 28 and permit the processor 20 to administer an open circuit voltage check of the energy storage device 28.

The uninterruptible power supply 10 operates in the "Off-Line" mode and continues to apply the power source line 12 power to the load 14 when the line AC signal from the power source line 12 is within an acceptable range.

The uninterruptible power supply 10 monitors the amplitude and frequency of the power source line 12. The uninterruptible power supply 10 enters an "On-Line" mode once the amplitude of the voltage signal from the power source line 12 drops below a first threshold value or exceeds a third threshold value, or the frequency of the line AC signal deviates from a specified range.

The uninterruptible power supply 10 may operate in a first mode or a second mode once it enters the "On-Line" mode. In a first "On-Line" mode, the power source line 12 signal has sagged below the first predetermined threshold (e.g., 95 VAC–105 VAC depending upon user setting) but not below a second predetermined threshold (e.g., 75 VAC), or exceeded the permissible range of frequency deviation (e.g., 1–3 Hz). The processor 20 may detect a sag or frequency deviation in the power source line 12 power through the line condition sensor 18.

The processor 20 maintains the system switch 22 in a closed position in the first "On-Line" mode. Therefore, power source line 12 power is applied to a line booster circuit 56.

The line booster circuit 56 essentially trades current from the power source line 12 for output voltage in the first "On-Line" mode of operation. This operation of the uninterruptible power supply 10 is advantageous inasmuch as the reserve power source the energy storage device 28 is not depleted during the first "On-Line" mode of operation and the energy storage device 28 power may be reserved for sags in the power source line 12 which drop below a second threshold.

In one embodiment of the uninterruptible power supply 10 shown in FIG. 1, the line booster circuit 56 includes a first converter 32. The first converter 32 transforms the AC power from the power source line 12 into a first DC voltage (e.g., 48 volts). The first DC voltage is applied to a second converter 34 within the line booster circuit 56. The second converter 34 boosts the first DC voltage to a second DC voltage (e.g., 150 volts DC) and applies the second DC voltage to an inverter 36 within the line booster circuit 56. The inverter 36 transforms the second DC voltage into a load AC signal (e.g., 120 VAC RMS).

The processor 20 configures the transfer switch 24 to route only the load AC signal from the line booster circuit 56 to the main bypass switch 26 and the load 14 when the uninterruptible power supply 10 operates in the first "On-Line" mode.

The uninterruptible power supply 10 operates in a second "On-Line" mode once the amplitude of the voltage signal from the power source line 12 drops below the second threshold (e.g., 75 volts) or exceeds the third threshold (e.g., 132 volts). In particular, the processor 20 opens the system switch 22 to isolate the power source line 12 power and shut down the first converter 32.

An internal supply circuit 58 is utilized to supply reserve power from an energy storage device 28 to the load 14 in the second "On-Line" mode of operation.

The internal supply circuit 58 includes an energy storage device 28. In one embodiment of the uninterruptible power supply shown in FIG. 1. The energy storage device 28 applies a first DC voltage to a second converter 34 within the internal supply circuit 58. The second converter 34 transforms the first DC voltage to the second DC voltage.

The second DC voltage is routed to the inverter 36 within the internal supply circuit 58. The second DC voltage is transformed into a load AC signal within the inverter 36. The processor 20 configures the transfer switch 24 to apply the load AC signal only to the main bypass switch 26 and the load 14 in the second "On-Line" mode of operation.

The second filter 38 may preferably be coupled with the output of the inverter 36. The second filter 38 provides interference filtering to the load AC signal from the inverter 36 and second converter 34 when the uninterruptible power supply 10 operates in the first or second "On-Line" mode. Specifically, the second filter 38 provides increased resistance within the load AC signal to higher frequency disturbances associated with electromagnetic interference and radio frequency interference (EMI\RFI).

The processor 20 continuously integrates the reserve power available in the energy storage device 28 during the second "On-Line" mode of operation to calculate the amount of time the load 14 may be powered by the energy storage device 28. In the absence of power from the power source line 12, reserve power in the energy storage device 28 is consumed until it drops below a cutoff value (e.g., 42 volts).

The processor 20 within the uninterruptible power supply 10 instructs smart loads 14 coupled with the output to shed power and initiate an orderly shutdown once the voltage within the energy storage device 28 drops below the cutoff value. The processor 20 can initiate a shutdown sequence via a dedicated full duplex RS-232 communication link if unattended or unintelligent loads 14 are coupled with the output of the uninterruptible power supply 10.

The uninterruptible power supply 10 will enter a "standby" state once a load 14 shutdown sequence has been completed. The processor 20 continues to monitor the power source line 12 voltage and energy storage device 28 voltage during the standby state. The user must initiate a manual power on sequence once a shutdown command is issued.

Energy within the energy storage device 28 will begin to be replenished if the power source line 12 power is restored before the processor 20 initiates a shutdown command. Depending upon the condition of the energy storage device 28, a broadcast message may be sent to connected intelligent loads 14 indicating that the energy storage device 28 is not fully capable of supporting further interruptions in power source line 12 power. Minor power interruptions, energy storage device 28 maintenance and inverter 36 operation is transparent to the user.

As shown in FIG. 1, the uninterruptible power supply 10 may include an interface 40 coupled with the processor 20. The interface 40 permits the uninterruptible power supply 10 to communicate with peripheral devices such as a printer and a remote host computer via communication hardware such as an RS 232 port, Ethernet link, telephone, and/or a modem.

The communications hardware can be accessed by the processor 20 for reporting messages to user defined telephone numbers (i.e., pagers, dedicated phones, etc.). In addition, the uninterruptible power supply 10 possesses the ability to answer telephone initiated instructions to shutdown the load 14, place the load 14 on the power source line 12 power or sustain the load 14 via the line booster circuit 56 or internal supply circuit 58.

Additional communications with the uninterruptible power supply 10 may be conducted over the communications hardware. The processor 20 also contains instructions which permit Graphical User Interface. This feature, when combined with a computer host and application specific software, provides the user with a remote status and control panel display of uninterruptible power supply 10 operation and configuration.

The uninterruptible power supply 10 may additionally include a control panel 42. The control panel 42 may include a display such as an alpha-numeric 32 character Liquid Crystal Display (LCD) to provide control and status indications, and an input device, such as a keyboard, allows an operator to select different features and functions within the uninterruptible power supply 10.

The processor 20 preferably includes a signal conditioning device for scaling the signals from the various sensors throughout the uninterruptible power supply 10 to a voltage which may be utilized by the processor 20. The processor 20 may also include an isolation device, such a plurality of opto-coupler devices 324, for providing electrical isolation of the processor 20 from the sensors to eliminate interference.

Depending upon the state of the uninterruptible power supply 10, the uninterruptible power supply 10 may operate in a "Bypass" mode. The power from the electrical utility may be routed directly to the main bypass switch 26 through a manual bypass switch 44 or an automatic bypass switch 46 when the uninterruptible power supply 10 operates in the "Bypass" mode.

For example, the operator may place the manual bypass switch 44 in a bypass position when the uninterruptible power supply 10 is serviced or the energy storage device 28 is replaced. In addition, the processor 20 may continuously perform self-check watchdog functions to detect a failure within the processor 20. The processor 20 automatically routes the power from the power source line 12 to the main bypass switch 26 through the automatic bypass switch 46 if the watchdog function of the processor 20 indicates a failure of the processor 20 has occurred.

The main bypass switch 26 may be configured to direct the power source line 12 power from the manual bypass switch 44 or the automatic bypass switch 46 to the load 14 in the "Bypass" mode.

Figure 2:
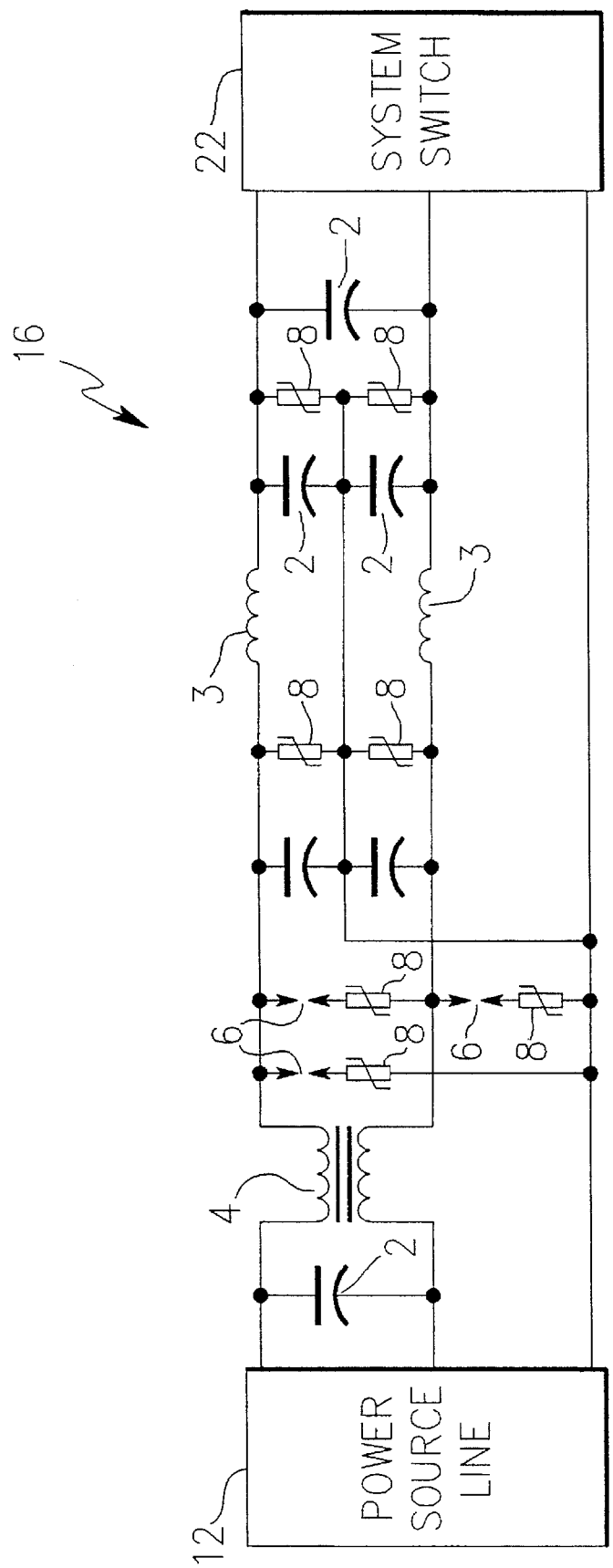
FIG. 2 is a schematic diagram of one embodiment of the first filter.

One embodiment of a first filter 16 or AC voltage processing circuit which may be used with the uninterruptible power supply 10 is shown in FIG. 2. The first filter 16 generally comprises a plurality of capacitors 2, inductors 3, spark gaps 6, varistors 8 and a common mode inductor 4.

The first filter 16 removes high frequency disturbances on the power source line 12 which may cause false line disturbance detection. In addition to the conductive disturbance filter, the energy absorbing devices enhance safe operation in the presence of transient voltages. These devices are used to conduct higher, short duration, transient voltages safely to ground (Transient Voltage Surge Suppresser (TVSS)). The power source line 12 conditioned voltage is routed to the input of the uninterruptible power supply 10.

Figure 3:
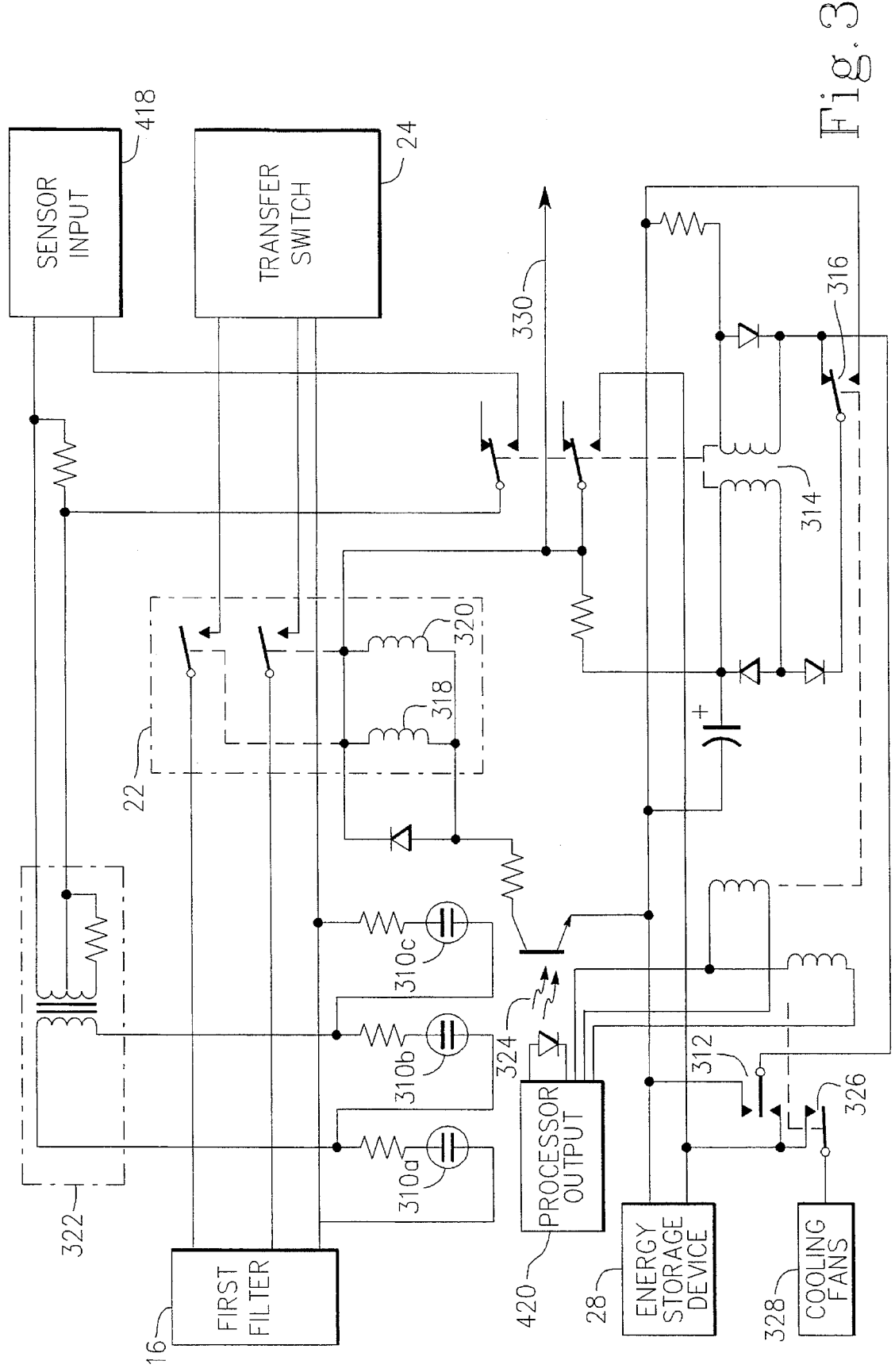
FIG. 3 is a schematic diagram of one embodiment of the system switch.

FIG. 3 is a schematic diagram of one embodiment of the system switch 22 and electromechanical control. A plurality of indicators 310a, 310b, 310c may be placed across the power source line 12 and earth safety ground. These indicators 310a, 310b, 310c are used for providing diagnostic information concerning the proper phasing and continuity of the power source line 12.

An on/off momentary power switch 312 is used to control a magnetic latching relay 314 which will permit manual application or removal of power. Power may also be removed under control of the processor 20 via a programmable shutdown relay 316.

Once power has been applied by actuating the on/off momentary power switch 312, the magnetic latching relay 314 is energized. Once closed, the magnetic matching relay 314 routes energy storage device 28 voltage to power the processor 20.

The processor 20 is instructed to initiate a power up routine upon application of power. This routine initializes the uninterruptible power supply 10, executes self tests, performs input power evaluation to determine closing of the first system switch relay 318 and the second system switch relay 320 and application of the power source line 12 power to the transfer switch 24 and the load 14 coupled with the output of the uninterruptible power supply 10.

The status of the energy storage device 28 is determined, and charging algorithms are initiated as necessary. The uninterruptible power supply 10 then enters a cyclic service routine which encompasses fixed interval performance monitoring. This performance monitoring/fault detection sequence permits continuous sequence and control of the uninterruptible power supply 10 functions. Referring to the transformer circuit 322 with the primary across AC HI and LO (LINE and NEUTRAL) of the power source line 12, and the secondary routed to the full wave rectifier 415 through sensor inputs shown in FIG. 4, the power source line 12 is connected through the transformer circuit 322 to a full wave rectifier 415.

Figure 4:
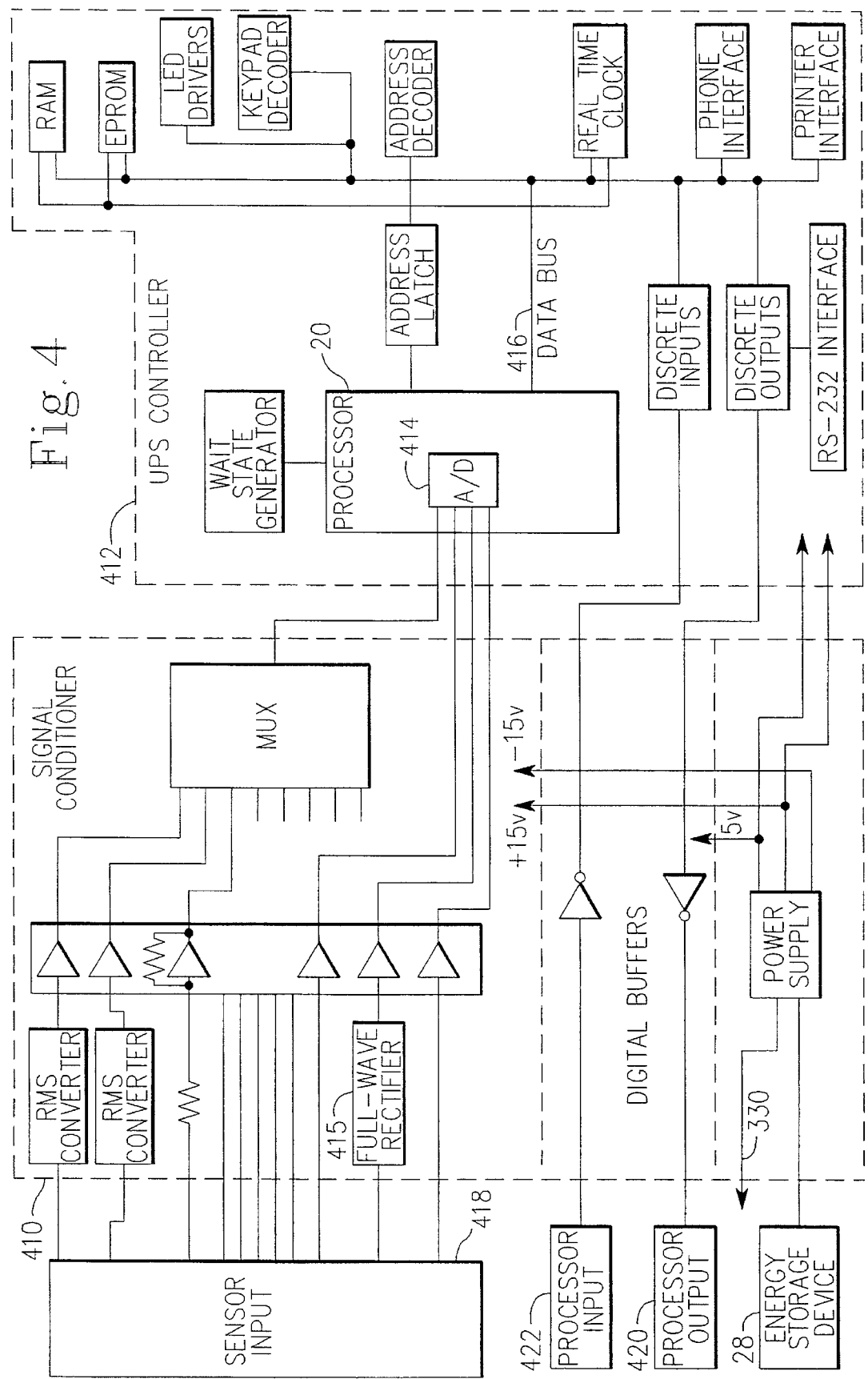
FIG. 4 is a schematic diagram of one embodiment of the signal conditioner and uninterruptible power supply controller.

The power source line 12 signal is scaled and presented to an analog to digital converter 414 within the uninterruptible power supply controller 412 shown in FIG. 4. The uninterruptible power supply controller 412 constantly interrogates this signal to determine if the power source line 12 is in a failed state.

If the uninterruptible power supply controller 412 qualifies the power source line 12 power as acceptable for use, the uninterruptible power supply controller 412 will issue a system power command which will sink current via the opto-coupler device 324 of FIG. 3 and saturate the related transistor which in turn will actuate the first system switch relay 318 and the second system switch relay 320.

The system cooling relay 326 of FIG. 3 turns on cooling fans 328 under control of the processor 20 which utilizes internal thermal sensor data from thermal sensors within the uninterruptible power supply 10 (not shown).

FIG. 4 represents one embodiment of signal conditioning and scaling devices of both source and sensor data presented to or transmitted from the processor 20. The processor 20 reads analog voltages through an analog to digital converter 414 and provides output drive signals via data bus 416 to the processor output 420 for operating the functions of the uninterruptible power supply 10. The processor 20 also receives communication interrupts from the communication interfaces shown in FIG. 4.

The processor 20 is isolated from the primary or secondary power paths of the power source line 12 by way of a signal sense transformer(s) (e.g., transformer circuit 322), opto-coupler devices 324, or relay coils. This isolation has been introduced in order to prevent contamination of computer operation by common mode disturbance which could exist between non isolated devices.

The data from the line condition sensor 18 is presented through the transformer circuit 322, the sensor input 418 and signal conditioner 410 to the analog to digital converter 414 of the processor 20 and is used to determine if the power source line 12 power is qualified for the uninterruptible power supply 10 and a load 14 coupled therewith. If the power source line 12 is free of fault criteria, the processor 20 will issue a system switch source signal, activating the system switch 22 and the transfer switch 24 which permits the power source line 12 power to be routed through the uninterruptible power supply 10.

Referring to FIG. 3, the power source line 12 power from the first filter 16 is connected in series through the first system switch relay 318 and second system switch relay 320. The normally open contacts of the first system switch relay 318 and second system switch relay 320 are connected to the transfer switch 24.

The state of the transfer switch 24 is determined by the processor 20 based upon sensory data from the line condition sensor 18 reporting the condition of the power source line 12. When the power source line 12 power has been judged to be unacceptable by the processor 20, the transfer switch 24 is programmed to connect the inverter 36 as the load 14 source of power as previously described. The output voltage and line synchronous operation of the inverter 36 is controlled by the processor 20 to emulate the power source line 12.

Output signals from the processor 20 control the operation of the inverter 36 based upon uninterruptible power supply 10 data sensed by the processor 20. Power source line 12 to inverter 36 synchronous operation is maintained by way of an output from an inverter zero crossing sensor.

The uninterruptible power supply 10 output, either from the power source line 12 or the inverter 36, is continuously monitored for proper voltage and current relationship. Should the load 14 exceed the rated power levels of the uninterruptible power supply 10, as detected by way of the load 14 voltage and current sensors (not shown), the processor 20 will remove load 14 power.

Internal ambient temperature and critical component temperatures are monitored for safe operation. Should processor thermal sensors indicate temperatures above predetermined thresholds contained within the embedded software, the processor 20 will command the energization of the system cooling relay 328. When the processor 20 has placed the load 14 on the inverter 36, and the load 14 is greater than predetermined power thresholds, an anticipation algorithm overrides temperature sensory data. During this condition the fan control is programmed in anticipation of the temperature rise to ensure adequate cooling exists before occurrence of a larger temperature gradient.

Energy is consumed from the energy storage device 28 during the operation of the uninterruptible power supply 10 in the second "On-Line" mode. If the power source line 12 interruption exceeds the reserve power of the energy storage device 28, the uninterruptible power supply 10 will remove load 14 power as a self preservation act. If this occurs, the uninterruptible power supply 10 will enter a "sleep" mode by direction of the processor 20. In this condition, the processor 20 monitors the power source line 12 for return of AC voltage. If the power source line 12 returns prior to the energy storage device 28 reaching a critical low level, the uninterruptible power supply 10 will resume operation by entering a power loss initialization routine which recharges the energy storage device 28 to full charge (e.g., 55 volts). Once the energy returned to the energy storage device 28 reaches a predetermined level, the uninterruptible power supply 10 will again qualify itself as being capable of performing an uninterruptible power supply 10 mission by resuming uninterruptible power supply 10 function.

In the event power source line 12 power is not returned prior to the energy storage device 28 reaching a critically low level, the uninterruptible power supply 10 processor 20 will issue a program shutdown command. This command will energize the programmable shutdown relay 316 which will cause the magnetic latching relay 314 to be placed in the reset position thereby removing power from the uninterruptible power supply 10. Under these circumstances, a user must make a conscious decision to re-apply power to the uninterruptible power supply 10 once power source line 12 power has been returned. The uninterruptible power supply 10 will enter a power loss initialization routine based upon the state of a power loss fail flag set when uninterruptible power supply 10 shutdown occurred.

The following discussion provides a more detailed discussion of one embodiment of the computer controller nucleus and the communications features of the uninterruptible power supply 10.

The processor 20 may communicate data to the user via a 32 character, alpha numeric liquid crystal display, three light emitting diodes, and an LED bar indicator within the control panel 42. The uninterruptible power supply 10 may also communicate electronically via a telephone, hardware user port, serial data communications port (RS232), a Local Area Network (LAN) connection and a parallel data communications port as input and output, source and destination. Telephone communication is via standard touch format where the telephone is used as both an input and an output device. A series of predetermined tone sequences permit programming the output of the uninterruptible power supply 10 or requesting the status of the uninterruptible power supply 10.

Hardware user ports may be of a 9 pin serial format and are used to communicate load 14 power status and shutdown information to intelligent loads 14 powered by the uninterruptible power supply 10. The serial interface port permits communication via a computer, dumb terminal or external modem via standard phone link. The parallel port is used to interface a local printer which permits a chronological (date and time stamped) listing of uninterruptible power supply 10 activity as well as electrical utility line disturbances. A keypad is provided as an input device to facilitate configuration of uninterruptible power supply 10 functions by the user.

As the processor 20 executes the power up sequence, a point is reached when the energy storage device contactor 48 shown in FIG. 1 is energized. The energy storage device 28 voltage and current sensory data are used by the processor 20 to implement a energy storage device charger algorithm. As the software of the processor 20 sequences through the charging routine, the first converter 32 is enabled and permitted to produce energy storage device 28 charge current and/or load 14 current. These devices are enabled by charger control signals from the processor 20.

Figure 5:
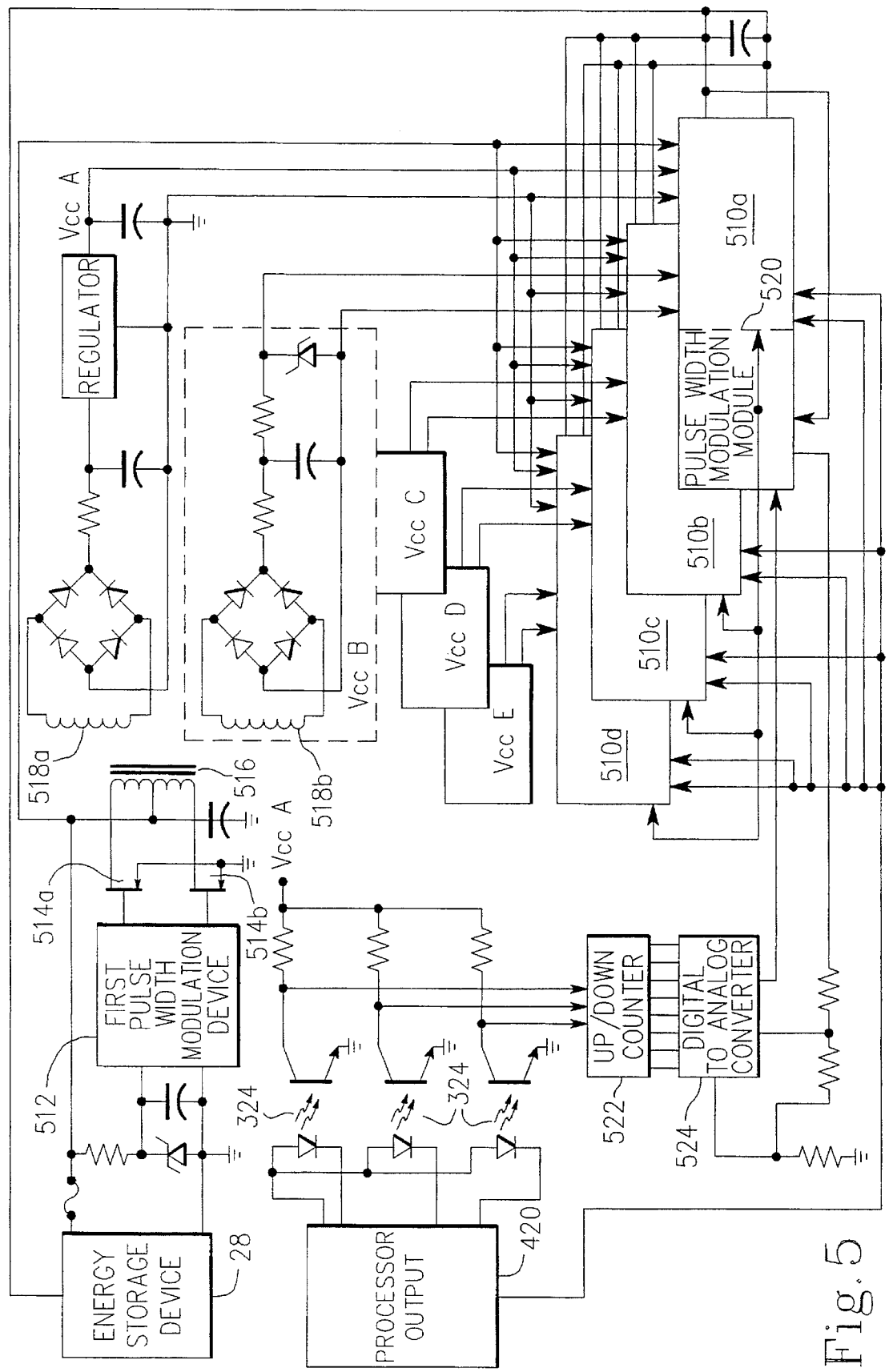
FIG. 5 is a schematic diagram of one embodiment of the first converter.

As shown in FIG. 5, the first converter 32 of the uninterruptible power supply 10 may include a plurality of AC-DC converters 510 for charging a plurality of individual energy storage devices 28. As the load 14 current or energy storage device 28 charge current may increase, additional AC-DC converters 510 are enabled. As the load 14 current or energy storage device 28 charge current may decrease, AC-DC converters 510 are disabled. Enable and disable criteria are based upon a maximum current profile. The AC-DC converters 510 are capable of operating in the voltage or constant current mode depending upon the load 14 profile.

During charging of the energy storage device 28, the algorithm implements a recommended charge profile of bulk current, voltage, and trickle charge and is further enhanced by the continuous monitoring of thermal sensors contained within each energy storage device 28 to ensure safe charge characteristics.

A plurality of AC-DC converters 510 for charging the energy storage devices 28 are shown in FIG. 5. As previously described with reference to FIG. 3, once the uninterruptible power supply 10 power has been initiated by the on/off monetary power switch 312, the magnetic latching relay 314 is energized making energy storage device 28 switched voltage available to the uninterruptible power supply 10 to power the processor 20. The power from the energy storage device 28 may be made available to the AC-DC converters 510 as housekeeping power.

A first pulse width modulation device 512, operating at a fixed 50% duty cycle is used to gate a first medium power field effect transistor 514a and a second medium power field effect transistor 514b which provide high frequency excitation to a first high frequency center tapped transformer 516. The first high frequency center tapped transformer 516 is made up of a plurality of secondaries 518 which are used to create the DC source of power for housekeeping.

Looking at circuit topology, a pulse width modulation module 520 is used to control a plurality of AC-DC converters 510 which are connected in parallel and utilized to charge a plurality of energy storage devices 28. Each AC-DC converter 510 is enabled or disabled by a plurality processor output signals. Each AC-DC converter 510 shares control when in the voltage mode.

When the modules are in the current mode, heavy load 14 currents or energy storage device 28 charge currents are shared by those modules which are enabled by the processor 20. During heavy current requirements, an electronic current limiting circuit (within each AC-DC converter 510) is used to influence the controlling the output pulse width of the pulse width modulation module 520, which in turn limits the current of the pulse width modulation module 520 by reducing the on period of a power field effect transistor within each AC-DC converter 510. The voltage mode control uses a precision voltage source, available at the controlling pulse width modulation module 520, to produce an offset reference for a digital to analog converter 524. The offset at the digital to analog converter 524 produces an error output returned to the pulse width modulation module 520 as a voltage set point. The offset was generated to insure that the reference voltage of the digital to analog converter 524 matched the system tolerances of the energy storage devices 28.

An up/down counter 522 is used to address the digital to analog converter 524. The up/down counter 522 may be initialized, set to zero count, which will produce an output equivalent to the allowable low energy storage device 28 voltage of the system. The up/down counter 522 may be incremented or decremented to increase or decrease the voltage magnitude. The processor 20 executes an embedded charge profile algorithm, in a closed loop manner, by monitoring the current being returned to the energy storage device 28 and adjusting the charger voltage to maintain the recommended current required by the manufacturer.

Because of unique system partitioning, the energy storage devices 28, which have reached the end of their service life may be replaced with fresh packs (hot swappable feature) without disturbing the load 14.

The bypass function is utilized during energy storage device 28 exchange or hardware failure. The manual bypass switch 44 is preferably a double pole single throw switch and is coupled with the processor 20 through one pole of the double pole single throw switch. The other pole of the manual bypass switch 44 is used to control the main bypass switch 26. Placing the manual bypass switch 44 in the bypass position causes the software to vector a bypass routine. When the bypass function is activated, all uninterruptible power supply 10 function is withheld from the load 14. The load 14 will be sustained from the power source line 12 power.

The processor 20 includes a watchdog function which monitors continuos and proper processor 20 operation. The watchdog will time out if the processor 20 operation is interrupted. If time out occurs, the automatic bypass switch 46 is set and the power source line 12 power is routed through the main bypass switch 26 to the load 14.

Figure 6:
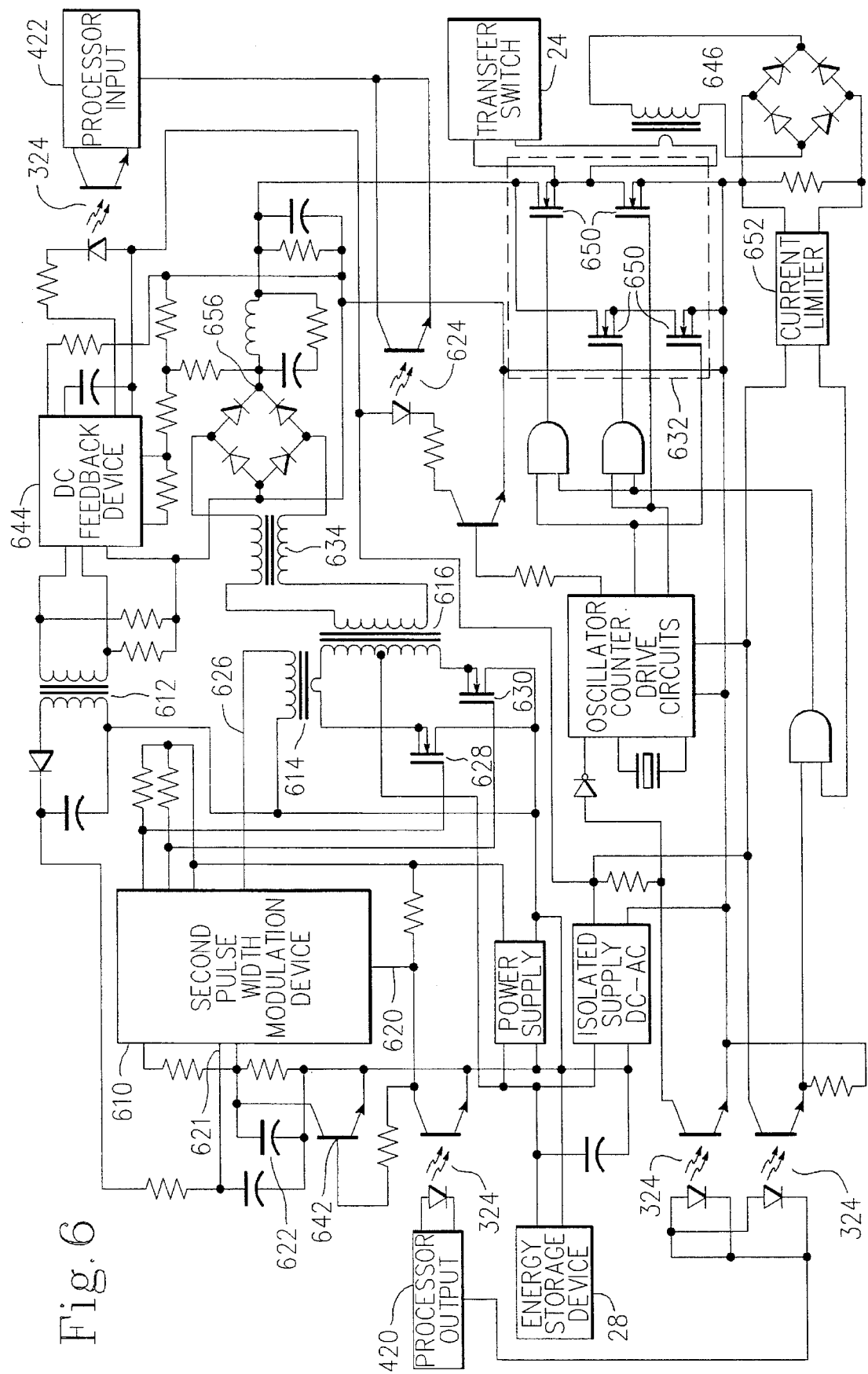
FIG. 6 is a schematic diagram of one embodiment of the second converter and inverter.

The function of the second converter 34 and inverter 36 is illustrated in FIG. 6. Power source line 12 isolation is maintained by a first transformer 612 and a second high frequency center tapped transformer 616. A second pulse width modulation device 610 is used to provide high frequency excitation of the second high frequency center tapped transformer 616. The second pulse width modulation device 610 is operated when the processor 20 permits current sink through a processor output 420 signal.

Under these conditions, a first input 620 of the second pulse width modulation device 610 is placed in the operate state. It also turns off a first transistor 642 permitting a first capacitor 622 to charge to the potential of the error voltage present at the second input 621 of the second pulse width modulation device 610. Initially the error difference at the second pulse width modulation device 610 is minimum. The output period of the second pulse width modulation device 610 is also minimum. As the error increases at the input of the second pulse width modulation device 610, the second pulse width modulation device 610 output duty cycle increases. The increase in the second pulse width modulation device 610 output duty cycle permits a first converter field effect transistor 628 and second converter field effect transistor 630 to remain on longer. As voltage develops at the secondary of the second high frequency center tapped transformer 616, an error signal is returned to the second pulse width modulation device 610 via the first transformer 612. A DC feedback device 644 monitors the rectifier bridge 656 and provides an error signal to the first transformer 612. The error at the second pulse width modulation device 610 begins to reduce until the closed loop conditions are satisfied. Once satisfied the second pulse width modulation device 610 maintains an output duty cycle which is proportional to the set point produced by the first transformer 612.

Since power output ratings are higher than available individual field effect transistors, power capacity is achieved by parallel use of output field effect transistors 650 arranged in an H-Bridge 632 and the second high frequency center tapped transformer 616 to enforce one load current. Primary current is monitored by the current sensor 614 (one core is used in each side of the second center tapped high frequency transformer 616 to prevent unbalanced current magnitudes from affecting the current sensor 614). As primary currents exceed predetermined thresholds, they are detected by the current sensor 614 and corrected by the second pulse width modulation device 610 by way of a third input 626 to the second pulse width modulation device 610. This technique permits parallel modules to meet output power requirements.

The second converter 34 has a first converter field effect transistor 628 and a second converter field effect transistor 630 per module which operate the second converter 34 in a push pull mode to create an AC voltage across the secondary winding of a second high frequency center tapped transformer 616 by alternately switching the energy storage device 28 across different halves of the second high frequency center tapped transformer 616.

As the first converter field effect transistor 628 conducts, the energy storage device 28 is connected across one half of the primary of the second high frequency center tapped transformer 616 and a positive voltage is applied across the AC output. When the second converter field effect transistor 630 conducts, the energy storage device 28 is connected across the other half of the second high frequency center tapped transformer 616 and a voltage of the opposite polarity and magnitude is created at the secondary.

A predetermined number of transformer secondaries are series wired, rectified and filtered to produce a high voltage DC supply of a magnitude that permits transformerless emulation of an AC source via an H-Bridge 632 implementation of a field effect transistor reversing switch assembly. To restrict high frequency stray current flowing across the second high frequency center tapped transformer 616, a common mode inductor 634 is inserted in the AC path of the DC side of the second converter 34. This provides needed high frequency isolation and improves diode recovery characteristics in the rectifier bridge 656. Galvanic isolation is also made possible via the arrangement of the second high frequency center tapped transformer 616 and the common mode inductor 634.

The high voltage DC is monitored by the processor 20 by a processor input 422 signal. In event that the high voltage 150 VDC supply falls outside 10% regulation, the processor 20 will remove inverter 36 power from the load 14.

The H-Bridge 632 can operate as a stepped approximation to a sine wave (Quasi-Sine Wave) or a full Sine Wave. When operated in a Quasi-Sine wave mode, the switching period is controlled to operate in a ⅔ on ⅓ off, 60 degree 6 period relationship (⅓ off, ⅔ on positive, ⅓ off, ⅔ on negative) with the high voltage DC to produce the required RMS equivalent of a typical power source line 12.

When energy in the energy storage device 28 is consumed during inverter 36 operation with the load 14, the output amplitude, left unattended, would also decline. The uninterruptible power supply 10 compensates for such decline by using closed loop feedback techniques which increase the pulse width output of the second pulse width modulation device 610 on the primary side of the second converter 34. The error voltage generated via the first transformer 612 is used to maintain a constant 150 VDC until the energy storage device 28 reaches a critically low energy level. The output frequency of the inverter 36 is crystal controlled, enabled by and synchronized to the power source line 12 by the processor 20 via processor output 422 signals. An output of the zero crossing sensor is used to synchronize the inverter 36 to the power source line 12.

The H-bridge 632 is also capable of providing cycle by cycle electronic current limiting by sensing the output current flow via a second transformer 646 and comparing it with a fixed reference provided by the current limiter 652. The error signal in turn inhibits or permits inverter 36 operation. Loads 14 using high peak currents in its power supply input lines will benefit from this arrangement. These high inrush currents set the peak power rating of the uninterruptible power supply 10. By providing the above described current limiting, the uninterruptible power supply 10 operation is safeguarded from cyclic overloads when still providing the required power to loads 14 with high peak inrush currents.

The uninterruptible power supply 10 also includes voltage, current and temperature monitors. The voltage and current monitoring devices are placed after the transfer switch 24 for use without regard to the load 14 power source power source line 12 or the inverter 36. The voltage and current of the load 14 are constantly monitored by the processor 20 for proper application of power to the load 14. These circuits are also used by the processor 20 to calculate the uninterruptible power supply 10 output power by using voltage, current and phase information. For the primary and secondary power path, appropriate series and parallel components are placed in line to minimize conductive emissions and susceptibility in and out of the uninterruptible power supply 10. Temperature monitoring devices are used not only to measure ambient energy storage device 28 and heat sink temperatures, but also junction temperatures of the first converter field effect transistor 628 and second converter field effect transistor 630. The thermal characteristics of the power devices are preprogrammed in processor 20 so the processor 20 can anticipate the thermal behavior of the first converter field effect transistor 628 and second converter field effect transistor 630. Based upon the data received, the processor 20 takes appropriate action, such as management of air flow and alarms, etc.

While preferred embodiments of the invention have been shown and described herein, it will be appreciated by those skilled in the art that various modifications and alternatives to the disclosed embodiments may be developed in light of the overall teachings of the disclosure. Accordingly, the disclosed embodiments are meant to be illustrative only and not limiting to the scope of the invention which is to be given the full breadth of the following claims and all equivalents thereof.

We claim:

1. An uninterruptible power supply to provide AC electrical power from a power source line to a load, comprising:

a. a line booster circuit coupled to the power source line in a first on-line mode of operation to increase the voltage supplied to the load from the power source line in response to the voltage of the power source line dropping below a first voltage threshold value while being above a second threshold value or deviating from a specified frequency range;

said booster circuit including, (i) a first converter coupled to the power source line to rectify a line AC signal and generate a DC signal, (ii) a second converter coupled to the first converter to increase the voltage of said DC signal generated by said first converter in said first on-line mode of operation and coupled to an internal DC energy storage device providing another DC signal in a second on-line mode of operation, and (iii) an inverter coupled to the second converter to convert the DC signals from said first converter and said internal DC energy storage device to a load AC signal;

b. an internal supply circuit including said internal DC energy storage device to supply reserve power to the load in said second on-line mode of operation in response to the voltage of the power source line dropping below said second threshold value or exceeding a third threshold;

c. a transfer switch to selectively connect said power source line, said line booster circuit, and said internal supply circuit to the load;

d. a system switch to selectively connect the power source line to said line booster circuit and said transfer switch;

e. a main bypass switch to selectively connect the power source line and said transfer switch to the load;

f. a contactor interposed between said first converter and said DC energy storage device to selectively isolate said energy storage device from said first converter; and g. a processor for monitoring and controlling the power supply and being operable: (1) to configure said system switch, said transfer switch, and said main bypass switch to pass AC power directly from said power source line to said load in an off-line mode of operation, (2) to close said system switch to apply AC power from said power source to said line booster circuit and to configure said transfer switch to route AC power only from said inverter to said load in said first on-line mode of operation, and (3) to open said system switch to isolate AC power from the power source line, shut down said first converter and apply DC power from said DC energy storage device to said second converter through said contactor and configure said transfer switch so as to apply AC power only from said inverter to the main bypass switch in said second on-line mode of operation.

2. The uninterruptible power supply of claim 1 further comprising a line condition sensor coupled to the power source line to monitor the quality of the power from the power source line.

3. The uninterruptible power supply of claim 1 further comprising a control panel connected to said processor to provide communication with a user.

4. The uninterruptible power supply of claim 1 wherein the first converter charges the energy storage device in response to the voltage of the power source line exceeding the second threshold value.

5. The uninterruptible power supply of claim 1 further comprising an energy storage device sensor coupled to the energy storage device to monitor the reserve power therein.

6. A method of providing continuous electrical power from an AC power source line to a load, comprising the steps of:

a. monitoring a line AC signal from the power source line;

b. supplying power directly from said AC power source line to said load in an off-line mode when the amplitude of the AC line signal is above a first threshold value;

c. increasing the amplitude of said AC line signal in response to the voltage of the AC line signal dropping below said first threshold value while being above a second threshold value or exceeding a predetermined range of frequency deviation by converting said AC line signal to a first DC voltage signal of a relatively low value, converting the first DC voltage to a second DC voltage signal having a relatively high value, inverting the second DC voltage signal to a load AD signal, and then supplying said load AC signal to the load in a first on-line mode; and d. generating and applying AC power to the load in response to the voltage of the line AC signal dropping below said second threshold value or exceeding a third threshold value by converting a third DC voltage signal supplied from an internal energy storage device to a said second DC voltage signal, inverting the second DC voltage signal to a load AC signal and then supplying said load AC signal to the load in a second on-line mode.

7. The method of claim 6 wherein the internal source comprises a DC energy storage device.

8. The method of claim 7 further comprising the step of monitoring the energy storage device.

9. The method of claim 8 wherein the steps of monitoring of the line AC signal and monitoring of the energy storage device are performed by a processor.

10. The uninterruptible power supply of claim 1 and further comprising a filter circuit coupled between the power line and said system switch to provide resistance to frequency disturbances associated with electromagnetic interferences and radio frequency interference.

11. The uninterruptible power supply of claim 1 and further comprising a filter circuit coupled between said inverter and said transfer switch to provide interference filtering of said load AC signal from said inverter and said second converter during said first and second on-line mode of operation.

* * * * *